United States Patent [19]

Harris et al.

[11] Patent Number: 5,633,091

[45] Date of Patent: May 27, 1997

[54] GRAFT COPOLYMERS HAVING ANHYDRIDE FUNCTIONALITY

[75] Inventors: Rodney M. Harris, Chicago; Mohamad D. Shalati, Homewood; Joyce A. Bibeau, Richton Park, all of Ill.

[73] Assignee: The Sherwin-Williams Company, Cleveland, Ohio

[21] Appl. No.: 704,347

[22] Filed: Aug. 26, 1996

Related U.S. Application Data

[62] Division of Ser. No. 583,580, Jan. 5, 1996, Pat. No. 5,550,195, which is a continuation of Ser. No. 176,629, Jan. 3, 1994, abandoned.

[51] Int. Cl.$^6$ ............................ C08F 267/04; B32B 27/00
[52] U.S. Cl. ............................ 428/500; 428/447; 525/285; 525/207; 525/74
[58] Field of Search ..................... 428/500, 447; 525/285, 207, 74

[56] References Cited

U.S. PATENT DOCUMENTS

| | | | |
|---|---|---|---|
| 2,884,408 | 4/1959 | Phillips et al. | 260/78.3 |
| 3,523,143 | 8/1970 | Kwong | 260/835 |
| 3,975,314 | 8/1976 | Smyk et al. | 260/2 EP |
| 4,026,867 | 5/1977 | Gardiner | 260/46 |
| 4,107,114 | 8/1978 | Nakayama et al. | 260/22 CB |
| 4,374,235 | 2/1983 | Culbertson et al. | 526/262 |
| 4,396,774 | 8/1983 | Schaffhausen | 549/255 |
| 4,555,546 | 11/1985 | Patel | 525/194 |
| 4,599,432 | 7/1986 | Kuroda et al. | 549/255 |
| 4,703,101 | 10/1987 | Singer et al. | 528/87 |
| 4,720,555 | 1/1988 | Nash | 549/252 |
| 4,736,044 | 4/1988 | Hanson | 549/255 |
| 4,859,758 | 8/1989 | Shalati et al. | 527/313 |
| 4,871,806 | 10/1989 | Shalati et al. | 525/108 |
| 4,919,925 | 4/1990 | Ueda et al. | 424/76.1 |
| 4,927,669 | 5/1990 | Knox et al. | 427/239 |
| 4,927,868 | 5/1990 | Schimmel et al. | 523/439 |
| 4,946,744 | 8/1990 | Shalati et al. | 428/500 |
| 5,066,742 | 11/1991 | Gupta | 526/216 |
| 5,093,391 | 3/1992 | Barsotti et al. | 523/400 |
| 5,130,371 | 7/1992 | Fujita et al. | 525/64 |
| 5,206,295 | 4/1993 | Harper et al. | 525/207 |
| 5,227,243 | 7/1993 | Shalati et al. | 428/457 |
| 5,492,976 | 2/1996 | Shalati et al. | 525/285 |

FOREIGN PATENT DOCUMENTS

| | | |
|---|---|---|
| 979020 | 12/1975 | Canada ............ 260/700.7 |
| 436803A2 | 11/1990 | European Pat. Off. . |
| 4133978 | 4/1993 | Germany . |
| 46-27530 | 8/1971 | Japan . |
| 48-43191 | 12/1973 | Japan . |
| 62-96557 | 5/1987 | Japan . |
| 1225964 | 9/1989 | Japan . |

*Primary Examiner*—Karen A. Dean
*Attorney, Agent, or Firm*—Robert E. McDonald; Heidi A. Boehlefeld

[57] ABSTRACT

An anhydride-functional polymer obtained by reacting under graft copolymerization reaction conditions, (A) an unsaturated polymer which was obtained by reacting under ene reaction conditions a mixture of reactants comprising:

(i) an unsaturated anhydride having the structure:

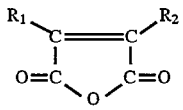

wherein $R_1$ and $R_2$ are each independently hydrogen, alkyl of 1 to about 6 carbons, or alkoxy of 1 to about 6 carbons, or a halogen; and (ii) at least one polyolefin having at least two carbon-carbon double bonds in the polyolefin backbone and having an average of at least three carbon atoms in the polyolefin backbone between the carbon-carbon double bonds; and (B) at least one ethylenically unsaturated monomer which is copolymerizable with the unsaturated polymer.

92 Claims, No Drawings

GRAFT COPOLYMERS HAVING ANHYDRIDE FUNCTIONALITY

This is a divisional application(s) Ser. No. 08/583,580 filed on Jan. 5, 1996, (now U.S. Pat. No. 5,550,195), which was in turn a continuation of Ser. No. 08/176,629, filed on Jan. 3, 1994, (now abandoned).

BACKGROUND OF THE INVENTION

1. Field of the Invention.

This invention relates to anhydride-functional polymers obtained by reacting, under graft copolymerization reaction conditions, (A) an unsaturated polymer obtained by reacting under ene reaction conditions:

(i) an unsaturated anhydride having the structure:

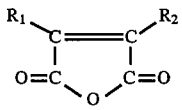

wherein $R_1$ and $R_2$ are each independently hydrogen, alkyl of 1 to about 6 carbons, or alkoxy of 1 to about 6 carbons, or a halogen; and (ii) at least one polyolefin having at least two carbon-carbon double bonds in the polyolefin backbone and having an average of at least three carbon atoms in the polyolefin backbone between the carbon-carbon double bonds; and (B) at least one ethylenically unsaturated monomer which is copolymerizable with the unsaturated polymer.

The polyolefin which is reacted under ene reaction conditions with the unsaturated anhydride will have an average of at least three carbon atoms in the backbone between the carbon-carbon double bonds. The backbone of such a polyolefin would be comprised primarily of repeating units having the structure:

wherein each x is individually a number from 2 to about 15; and $R_3$, $R_4$ and $R_5$ are each individually hydrogen, or a linear, branched or cyclic aliphatic group of 1 to about 18 carbon atoms. By "primarily" is meant that at least 60% by weight, and preferably at least 90% by weight, of the repeating backbone units of the polyolefin would have that structure.

The preferred polyolefin has the structure:

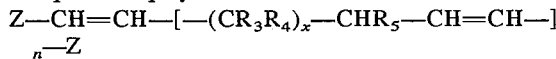

wherein each x, $R_3$, $R_4$ and $R_5$ is as defined above; each Z is individually hydrogen, or a linear, branched, or cyclic aliphatic group of 1 to about 36 carbons; and n is a number between 2 and 5,000.

The anhydride-functional graft copolymers should have an average of at least two anhydride groups per molecule, and are useful as corrosion or scale inhibitors, thickeners, dispersants, and as reactive agents and/or crosslinking agents for compounds having functional groups, such as epoxy, hydroxyl or amine groups, which are reactive with anhydride groups. The anhydride-functional graft copolymers can, therefore, be utilized in a variety of materials such as plastics, fibers, adhesives, paper sizing, inks and, particularly, coating compositions.

This invention also relates to novel reactive compositions which utilize the anhydride-functional graft copolymer in combination with one or more materials which can react with anhydride groups. These reactive compositions can be reacted at room temperature or force dried at temperatures ranging up to about 350° F. or higher if desired. When utilized as reactive crosslinking agents for coatings, the anhydride-functional graft copolymers may be utilized in a variety of coating applications, including primers and top-coats as well as clearcoats and/or basecoats in clearcoat/basecoat compositions.

The reactive compositions typically involve the combination of the anhydride-functional graft copolymer with materials reactive with anhydrides such as polyepoxides, polyamines, polyols, etc. One preferred reactive composition comprises the anhydride-functional graft copolymer and a polyol, preferably a hydroxy-functional polymer, optionally in combination with an epoxide or polyepoxide. Another preferred reactive composition comprises the anhydride-functional graft copolymer, an acid-functional compound, an epoxide or polyepoxide, and, optionally, a polyol. All of these combinations can provide fast reacting, durable coatings which minimize the toxicity problems which may be associated with other low temperature curing systems.

2. Description of the Prior Art.

Some polymers obtained by the reaction of unsaturated anhydrides and olefins are known in the art. Japanese examined patent application number 48-43191 teaches the Ziegler-Natta copolymerization of alkenyl anhydrides with olefins such as ethylene, butene or styrene, in the presence of a mixed catalyst comprising an organic metal compound and a transition metal compound. U.S. Pat. No. 4,374,235 teaches polymers obtained by the free radical initiated addition polymerization of an alkenyl succinic anhydride with one or more vinyl monomers such as maleic anhydride, maleimides, vinyl acetate, and alkyl vinyl ethers. U.S. Patent 4,599,432 teaches the production of alkenyl succinic anhydride compositions by the reaction of an olefin and maleic anhydride followed by the addition of a free radical catalyst to polymerize any unreacted olefin and maleic anhydride. U.S. Pat. No. 4,927,868 teaches resinous binders obtained by the free-radical initiated copolymerization of an α-olefin or cycloolefin and an olefinically unsaturated monoanhydride. U.S. Pat. No. 4,720,555 teaches hydrocarbons substituted with at least two anhydride moieties produced by the free-radical initiated copolymerization of a specified hydrocarbon and a molar excess of an organic anhydride. U.S. Pat. No. 5,066,742 teaches the free-radical addition copolymer of a $C_2$-$C_8$ olefin and maleic anhydride as an aqueous copolymer suspension.

The ene reaction involving unsaturated anhydrides with certain olefins is also known in the art. U.S. Pat. No. 4,026,867 teaches resinous condensation products made from (i) the ene reaction adduct of an unsaturated anhydride or acid or ester thereof, with a specified unsaturated liquid phenol or oligomer thereof, and (ii) an aldehyde. U.S. Pat. No. 4,107,114 teaches the ene reaction of maleic anhydride and unsaturated polyolefins such as polypentadiene. The resultant anhydride-functional polymer can be subjected to a ring cleavage reaction to produce an acid-functional polymer. U.S. Pat. No. 4,396,774 and U.S. Pat. No. 4,736,044 teach the ene reaction product of an unsaturated dicarboxylic anhydride and an ethylenically unsaturated hydrocarbon in the presence of a Lewis acid catalyst or a specified boron compound, respectively.

U.S. Pat. No. 4,927,669 teaches the ene reaction of maleic anhydride with unsaturated fatty acids. U.S. Pat. No. 4,919,925 teaches the ene reaction product of α-olefins and unsaturated anhydrides in the production of deodorizing compounds. U.S. Pat. Nos. 4,555,546 and 5,130,371 teach polyolefin graft copolymers having anhydride functionality.

Unsaturated anhydrides, such as maleic anhydride, and copolymers made from maleic anhydride are known in the art. Such anhydride copolymers are heterogeneous with respect to the distribution of anhydride groups along the backbone of the polymer due to the abnormal copolymerization behavior of maleic anhydride with other monomers, and the acid groups generated from opening these anhydrides by reaction with hydroxyl or amine groups are not highly reactive for further cure reactions, e.g. with epoxy groups, due to steric hindrance arising from the proximity of the anhydride ring to the polymer backbone. Such anhydride-functional polymers are also relatively viscous and may be difficult to utilize in combination with low levels of solvent. Additionally, such polymers may form dark colored materials when certain base catalysts, such as N-methyl imidazole, are used to accelerate a subsequent reaction of the polyanhydride with reactive materials such as hydroxy-functional compounds.

Curable compositions comprising polyanhydrides in combination with other reactive materials are also known in the art. For example, U.S. Pat. No. 4,946,744 teaches clearcoat/basecoat combinations involving (i) a polyanhydride, for example, such as that prepared by copolymerization of maleic anhydride with (meth)acrylic monomers, and (ii) a polyol. U.S. Pat. No. 4,871,806 teaches curable compositions comprising a polyanhydride, a polyacid, a polyol and an epoxy-functional compound. U.S. Pat. No. 4,859,758 teaches an acid-functional cellulose ester based polymer which could be used in combination with a polyanhydride and a polyepoxide.

BRIEF SUMMARY OF THE INVENTION

This invention involves anhydride-functional polymers obtained by reacting, under graft copolymerization reaction conditions, (A) an unsaturated polymer obtained by reacting under ene reaction conditions:
   (i) an unsaturated anhydride and
   (ii) a defined polyolefin; and
(B) a copolymerizable monomer.

Preferably, the final anhydride-functional graft copolymer will comprise at least 15 % by weight of anhydride groups.

The polyolefins useful in the practice of this invention, and especially the preferred cyclo-octene-based unsaturated hydrocarbons, permit the incorporation of surprisingly high levels of anhydride while still maintaining relatively low viscosity and good flexibility. The anhydride-functional graft copolymers have excellent performance characteristics including excellent cure kinetics, flexibility of cured films and the capability of providing higher solid coating formulations to minimize air pollution concerns. The anhydride-functional graft copolymers can be, if desired, fully or partially hydrolyzed to produce acid-functional polymers, or they can be directly utilized as crosslinking agents for materials having an average of at least two functional groups which are reactive with anhydride groups, such as epoxy, hydroxyl or amine functionality. If desired, the anhydride-functional graft copolymers could also be fully or partially hydrogenated, by methods well known in the art such as catalytic hydrogenation.

Therefore, this invention also relates to reactive or curable compositions which comprise (i) the anhydride-functional graft copolymers of this invention; and (ii) a compound having an average of at least two functional groups per molecule which are reactive with anhydride groups. A particularly preferred curable composition comprises (i) the anhydride-functional graft copolymer and (ii) a hydroxy-functional compound having an average of at least two hydroxyl groups per molecule, optionally in combination with an epoxide or polyepoxide. Another preferred combination comprises (i) the anhydride-functional graft copolymer; (ii) an acid-functional compound having an average of at least two acid groups per molecule, (iii) an epoxide or polyepoxide, and, optionally, (iv) a hydroxy-functional compound having an average of at least two hydroxyl groups per molecule. Another useful composition comprises (i) the anhydride-functional graft copolymer; and (ii) a polyamine compound having an average of at least two primary and/or secondary amine groups per molecule. The term "compound" is used in its broadest sense to include monomers, oligomers and polymers.

Although the curable compositions of this invention can be utilized without solvent in many applications, it is especially preferred to utilize the curable composition of this invention in combination with about 5 % to about 75 % by weight, based upon the total weight of the mixture, of an inert solvent. It is convenient to provide the reactive composition as a multicomponent system which is reactive upon mixing the components. Especially preferred is a two-component system wherein the anhydride-functional graft copolymer and the acid-functional compound, if utilized, are combined in one package and the epoxy-functional compound and/or the hydroxy-functional compound provide a second package. The two packages can then be mixed together to provide the curable composition immediately prior to use.

In one preferred application, this invention also relates to coated substrates having a multi-layer decorative and/or protective coating which comprises:

(a) a basecoat comprising a pigmented film-forming polymer; and
(b) a transparent clearcoat comprising a film-forming polymer applied to the surface of the basecoat composition;

wherein the clearcoat and/or the basecoat comprises the curable compositions of this invention. The term "film forming polymer" means any polymeric material that can form a film from evaporation of any carrier or solvent.

Accordingly, one object of this invention is to provide a novel anhydride-functional polymer by the graft copolymerization of:

(A) an unsaturated polymer which was obtained by the ene reaction of an unsaturated anhydride and a specified class of polyolefins; and
(B) an unsaturated monomer copolymerizable therewith.

Another object is to provide improved curable compositions having excellent reactivity at low temperatures. It is a further object to provide coating compositions which may be utilized as primers, topcoats or clearcoats and/or basecoats in clearcoat/basecoat compositions. Another object is to provide an improved two-package coating composition wherein one package comprises a novel anhydride-functional graft copolymer and, optionally, an acid-functional compound, and the other package comprises an epoxy-functional compound and/or a hydroxyl-functional compound. Another object of this invention is to provide coatings having excellent reactivity, durability and corrosion resistance. A further object is to provide improved coating compositions which can be cured at room temperature or force dried at elevated temperatures. Another object is to provide curable compositions that are relatively low in viscosity and which can be utilized with reduced amounts of volatile organic solvents. These and other objects of the invention will become apparent from the following discussions.

DETAILED DESCRIPTION OF THE INVENTION

The ene reaction is a well known synthetic reaction in which an olefin having an allylic hydrogen reacts thermally with an eneophile with formation of a new sigma-bond to a carbon atom, migration of the allylic hydrogen to the eneophile, and a change in the position of the double bond of the olefin. For example, the ene reaction between maleic anhydride and a linear polyolefin obtained by the metathesis of cyclooctene would proceed in an idealized, representative fashion as follows:

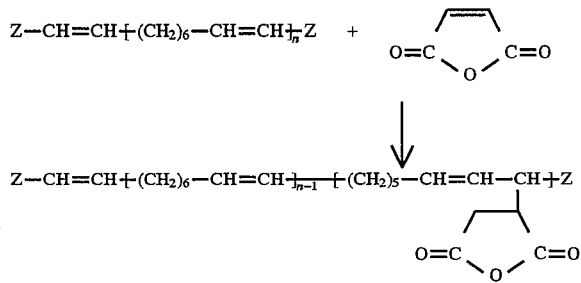

Since double bonds are not eliminated, but are merely shifted in the polyolefin, additional ene reactions can take place at the new location of the double bond, and since the ene reaction can take place at either carbon of the olefin double bond, there will be differing numbers of carbon atoms between the double bonds on the polymer backbone. Depending on the stoichiometry employed, there may be unreacted olefinic segments interspersed among the repeating units having pendent succinic anhydride groups. If greater than one molar equivalent of unsaturated anhydride per olefin repeating unit is used, some of the olefin repeating units will contain more than one anhydride segment.

Representative discussions of olefin metathesis to produce polyolefin polymers are given in Irvin, K. J. in *Olefin Metathesis*, Academic Press, London, 1983; by Grubbs, R. H. in *Comprehensive Organometallic Chemistry*, Wilkinson, G. et al. (Eds), Vol 8, Pergamon New York (1982); by Dragutan, V. et al., *Olefin Metathesis and Ring-Opening Polymerization of Cyclo-Olefins*, 2nd Ed., Wiley Interscience, New York (1985); and by Leconte, M. et al. in *Reactions of Coordinated Ligands*, Braterman, P. R. (Ed.), Plenum New York (1986).

Representative unsaturated anhydrides which are useful in the practice of this invention include maleic anhydride, chloromaleic anhydride, itaconic anhydride, citraconic anhydride, methoxymaleic anhydride, ethylmaleic anhydride, etc. Maleic anhydride is especially preferred due to its relatively low cost and availability.

The preferred polyolefins which are useful in the practice of this invention have the structure:

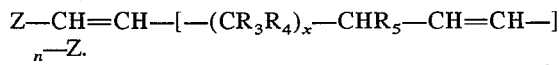

Polyolefins having repeating units wherein x is less than 2, e.g. polybutadiene, are not useful because high levels of anhydride incorporation, e.g. more than about 15% by weight, leads to very high viscosities. Especially preferred polyolefins are those wherein x is between 4 and 12. Polyolefins wherein n is greater than 5 are generally preferred because they have a sufficient number of double bonds for convenient incorporation of relatively high levels of anhydride. Particularly preferred polyolefins are those wherein n is between 2 and 100 and especially between 8 and 28. Especially preferred polyolefins are those wherein $R_3$, $R_4$ and $R_5$ are all hydrogen.

Polyolefins which are especially useful in the practice of this invention can be conveniently prepared by the olefin metathesis of cyclic olefins, typically by a linear olefin. Metathesis of cyclic olefins with themselves or other cyclic olefins produces larger cyclic olefins. Metathesis of cyclic olefins with non-cyclic olefins produces ring opened, linear polymeric olefins. For example, metathesis of a mixture of cyclooctene and small amounts of vinyl cyclohexane in the presence of a metathesis catalyst yields polyoctenemers possessing methylene and/or cyclohexane end groups. The ratio of vinyl cyclohexane to cyclooctene, catalyst selection and level and reaction temperature controls molecular weight. One such idealized reaction is shown below:

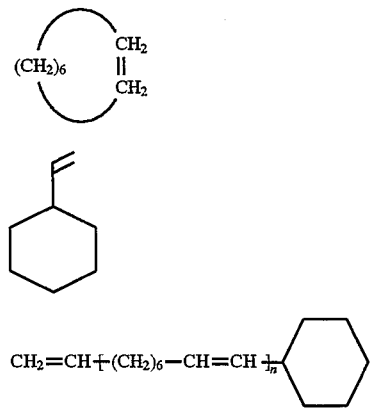

Polyolefins having different alkyl chains between unsaturation sites can be prepared by the metathesis of cyclic olefin monomers of various sizes. For example, a similar metathesis of cycloheptene would produce idealized repeating units of

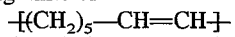

and a similar metathesis of cyclopentene would produce idealized repeating units of

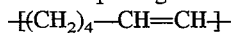

Other cyclic olefins which are practical for preparing the polyolefins useful in this invention include, cyclohexene, cyclononene, cyclodecene, cycloundecene, cyclododecene and norbornene. If desired, mixtures of cyclic olefins can be used to prepare the polyolefin.

The preparation of useful polyolefins can thus be achieved through metathesis. Successive metathesis reactions of cyclic olefins terminated by the metathesis reaction with a linear olefin furnishes linear polymers having multiple unsaturation sites. Polyoctenemers referred to under the trade name "Vestenamers" were available from Huls Aktiengesellschaft, Marl, Germany.

The metathesis reaction is typically conducted at temperatures ranging from 0° C. to about 120° C. Useful molecular weight ranges for the defined polyolefins useful in this invention can be obtained by the metathesis of a cyclic olefin and a non-cyclic olefin in molar ratios ranging from about 2-1 to 5000-1.

Metathesis catalysts are well known in the art and representative examples include the halides, oxyhalides and oxides of tungsten, molybdenum and tantalum. Suitable metathesis catalysts are tungsten hexachloride, tungsten oxytetrachloride, tungsten oxide, tridodecylammonium tungstate, tri(tridecyl)ammonium tungstate, trioctylammonium tungstate, molybdenum pentachloride, molybdenumoxytrichloride, acetylacetonatomolybdenumoxide, tridodecylammonium molybdate, trioctylammonium molybdate and tantalum pentachloride. One suitable catalyst for the metathesis reaction, described by Calderon, et al. in *Advances in Organometallic Chemistry* 1979 17, 479, is prepared by mixing tungsten hexachloride, ethylaluminum chloride and ethanol under a nitrogen atmosphere. The metathesis catalyst is typically present at a level of at least 0.01 parts for each 100 parts by weight of monomers.

Another process to produce the defined polyolefins of this invention is by molecular weight reduction of high molecular weight polymers as taught by K. W. Scott, N. Calderon, E. A. Ofstead, W. A. Judy and J. P. Ward, *Adv. Chem. Ser.* 1969 91,399. This process, which is similar to the previously described production of ring opened polyolefins, is accomplished by adding a low molecular weight olefin such as ethylene or butene to a high molecular weight cycloalkene in the presence of a metathesis catalyst.

1. ANHYDRIDE-FUNCTIONAL POLYMERS

As used herein the term "ene reaction conditions" means reaction conditions sufficient to cause the desired degree of ene reaction between the unsaturated anhydride and the polyolefin.

The ene reaction for producing the anhydride-functional polymers which are useful in the practice of this invention is conducted by admixing an unsaturated anhydride, such as maleic anhydride or a substituted maleic anhydride, with the specified polyolefins and maintaining the reaction at 140° C. to 300° C., and preferably 160° C. to 200° C., until the desired degree of reaction is obtained. The reaction proceeds in very high yields and virtually all of the anhydride is typically incorporated. Remaining unreacted anhydride, if any, can be, if desired, removed by vacuum distillation or other suitable method. Alternatively, any remaining anhydride can be incorporated by polymerization with the other monomers during the graft copolymerization. The ene reaction can be conducted, if desired, in the presence of an inert solvent such as xylene, toluene, methyl amyl ketone, ethylene glycol monobutyl ether acetate, etc., or, if the polyolefin is liquid at the reaction temperature, the ene reaction can be conducted without solvent. The anhydride and polyolefin can be mixed in virtually any ratio to provide any desired degree of anhydride functionality in the final polymer. Typically, the mixture will comprise 1% to about 70%, and especially 15% to about 45% anhydride by weight and the remaining 30% to 99%, and especially 85 % to 55 % by weight being the polyolefin.

Because the ene reaction does not eliminate double bonds, but merely shifts them in the polyolefin, the anhydride-functional polymer produced by the ene reaction will still maintain essentially the same number of double bonds as the starting polyolefin. These carbon-carbon double bonds provide allylic hydrogen atoms which are particularly suitable reactive sites for graft copolymerization. As used herein the term "graft copolymerization reaction conditions" means those reaction conditions sufficient to cause the desired degree of copolymerization of the ethylenically unsaturated monomer with the anhydride-functional unsaturated polymer. The graft copolymerization is typically carried out by solution polymerization in an inert solvent in the presence of a free-radical addition polymerization initiator. Typically, a solvent solution of the anhydride-functional unsaturated polymer will be prepared and heated to the reaction temperature, typically in the range of about 50° C. to 180° C. and preferably between 100° C. to about 160° C. and a mixture of the unsaturated monomers and free-radical initiators, capable of hydrogen abstraction from the anhydride-functional unsaturated polymer, will be added slowly to the heated polymer solution.

Typical monomers which can be copolymerized with the anhydride-functional unsaturated polymer to produce the anhydride-functional graft copolymer include:

(a) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, lauryl acrylate, ethylhexyl acrylate, amyl acrylate, 3,5,5-trimethylhexyl acrylate, lauryl methacrylate, methyl methacrylate, ethyl methacrylate, propyl methacrylate, isobornyl methacrylate, ethyl tiglate, methyl crotonate, ethyl crotonate, etc.;

(b) vinyl compounds such as vinyl acetate, vinyl propionate, vinyl butyrate, vinyl isobutyrate, vinyl benzoate, vinyl m-chlorobenzoate, vinyl p-methoxybenzoate, vinyl α-chloroacetate, vinyl toluene, vinyl chloride, etc.;

(c) styrene-based materials such as styrene, α-methyl styrene, α-ethyl styrene, α-bromo styrene, 2,6-dichlorostyrene, etc.;

(d) allyl compounds such as allyl chloride, allyl acetate, allyl benzoate, allyl methacrylate, etc.;

(e) other copolymerizable unsaturated monomers such as ethylene, acrylonitrile, methacrylonitrile, dimethyl maleate, isopropenyl acetate, isopropenyl isobutyrate, acrylamide, methacrylamide and dienes such as 1,3-butadiene, etc.;

(f) unsaturated acids and anhydrides, such as acrylic acid, methacrylic acid, crotonic acid, tiglic acid, maleic anhydride, etc.

Typically the monomers and the anhydride-functional unsaturated polymer will be reacted in the presence of a conventional initiator known in the art to generate a free radical such as azo-bis(isobutyronitrile), cumene hydroperoxide, t-butyl perbenzoate, t-butyl peroctoate, amyl peroctoate, etc. The molecular weight of the polymer can be controlled, if desired, by the monomer selection, reaction temperature and time, and/or the use of chain transfer agent as is well known in the art. The relative weight ratios of unsaturated polymer (A) to copolymerizable ethylenically unsaturated monomer (B) can be widely varied to provide final anhydride-functional graft copolymers having any desired characteristics. In general, it is preferred to utilize 5 to about 95 and preferably 50 to about 90 parts by weight solid of the polymer (A) with the remainder being the unsaturated monomers (B).

For some applications, it may be advantageous to minimize any hydrolysis of the anhydride-functional polymer by removing any water contamination during and/or after manufacture of the polymer by azeotropic distillation utilizing an inert solvent which is capable of forming an azeotrope with water. Preferred azeotropic solvents include aromatic or aliphatic hydrocarbons or their halogenated derivatives such as benzene, toluene, xylene, ethylbenzene, chlorobenzene, cyclohexane, etc. Xylene is especially preferred.

It also may sometimes be useful to filter the resultant polymer solution to remove certain insoluble impurities. One preferred filter media is FP-2 diatomaceous earth from Eagle Picher.

2. ACID-FUNCTIONAL COMPOUNDS.

The acid-functional compounds which, optionally, can be used in combination with the anhydride-functional graft copolymers of this invention in preparing curable compositions should have an average of at least two carboxylic acid groups per molecule. Although low molecular weight diacids and polyacids such as phthalic acid, succinic acid, adipic acid, azelaic acid, maleic acid, fumaric acid, trimellitic acid and trimesic acid can be utilized in combination with the anhydride-functional graft copolymers in the practice of this invention, it is especially preferred to utilize polymeric acid-functional compounds.

Preferably the acid-functional polymer will have a number average molecular weight of at least about 400. Typical number average molecular weights of the carboxylic acid-functional polymers will range from about 500 to about 30,000. Representative acid-functional polymers include acrylics, polyesters and polymers prepared by the reaction of anhydrides with hydroxy-functional polymers as discussed more fully below.

2.A. Carboxylic acid-functional polymers prepared by the half-ester forming reaction of anhydrides and hydroxy-functional polymers.

Especially preferred as acid-functional compounds in the curable compositions of this invention are the carboxylic acid-functional polymers prepared by the half-ester opening of the cyclic anhydride by reaction with a hydroxyl group on the hydroxy-functional polymer to form one ester group and one acid group.

Typically, the hydroxy-functional polymers will have number average molecular weights of at least about 400 and typical number average molecular weights will range from about 400 to about 30,000, and especially 1,000 to about 15,000. Methods of preparing hydroxy-functional polymers are well known in the art and the method of preparation of the hydroxy-functional molecule or polymer which is reacted with the cyclic carboxylic anhydride to produce the optional acid-functional polymer is not critical to the practice of this invention. Representative polymers which can be reacted with anhydrides to produce the acid-functional polymers include the hydroxy-functional polyethers, polyesters, acrylics, polyurethanes, polycaprolactones, etc. as generally discussed in Sections 2.A. 1. through 2.A.5. below.

2.A.1. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257–262, published by Interscience Publishers, Inc., 1951; and in Kirk-Othmer *Encyclopedia of Chemical Technology*, Volume 18, pages 638–641, published by Wiley-International, 1982. Representative examples include the polypropylene ether glycols and polyethylene ether glycols such as those marketed as Niax® Polyols from Union Carbide Corporation.

2.A.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted in stoichiometric excess with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol 1,2-cyclohexanedimethanol, 1,3-cyclohexanedimethanol, 1,4-bis(2-hydroxyethoxy)cyclohexane, trimethylene glycol, tetra methylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane- 1,3-diol, 2-butene- 1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

2.A.3. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

2.A.4. Other useful hydroxy-functional polymers can be prepared by the reaction of an excess of at least one polyol, such as those representatively described in Section 2.A.2 above, with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocya- natomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenylmethane-4,4',4"-triisocyanate, 1,3,5-triisocyanatebenzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

2.A.5. Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetra ethylene glycol acrylate, para-vinyl benzyl alcohol, etc. Typically the hydroxy-functional monomers would be copolymerized with one or more monomers having ethylenic unsaturation such as:

(i) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, t-butyl methacrylate dimethylaminoethyl methacrylate, isobornyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl α-chloroacetate, vinyl toluene, vinyl chloride, etc.;

(iii) styrene-based materials such as styrene, α-methyl styrene, α-ethyl styrene, α-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as ethylene, acrylonitrile, methacrylonitrile, dimethyl maleate, isopropenyl acetate, isopropenyl isobutyrate, acrylamide, methacrylamide, and dienes such as 1,3-butadiene, etc.

The polymers are conveniently prepared by conventional free radical addition polymerization techniques. Frequently, the polymerization will be catalyzed by conventional initiators known in the art to generate a free radical such as t-butyl peroxyoctoate, t-butyl peroxybenzoate, d-t-butyl peroxide, di-t-amyl peroxide, azobis(isobutyronitrile), cumene hydroperoxide, t-butyl perbenzoate, etc. Typically, the acrylic monomers are heated in the presence of the catalyst at temperatures ranging from about 35° C. to about 200° C., and especially 75° C. to 150° C., to effect the polymerization. The molecular weight of the polymer can be controlled, if desired, by the monomer selection, reaction temperature and time, and/or the use of chain transfer agents as is well known in the art.

Especially preferred polymers in the practice of this invention for reaction with the cyclic anhydride to produce the carboxylic acid-functional polymers are hydroxy-functional polyesters and hydroxy-functional acrylic polymers. An especially preferred hydroxy-functional polymer is the addition polymerization reaction product of (a) 5 to 100, and especially 10 to about 40, weight percent of a hydroxy-functional ethylenically unsaturated monomer and (b) 0 to 95, and especially 60 to about 90, weight percent of at least one other ethylenically unsaturated monomer copolymerizable with the hydroxy-functional monomer.

The cyclic carboxylic acid anhydrides useful in the practice of this invention to produce the carboxylic acid-functional half- ester product by reaction with the hydroxy-functional compound can be any monomeric aliphatic or aromatic cyclic anhydride having one anhydride group per molecule. Representative anhydrides include phthalic anhydride, 3-nitrophthalic anhydride, 4-nitrophthalic anhydride, 3-flourophthalic anhydride, 4-chlorophthalic anhydride, tetrachlorophthalic anhydride, tetrabromophthalic anhydride, tetrahydrophthalic anhydride, hexahydrophthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endomethylenetetrahydrophthalic anhydride, cyclohexane- 1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, etc. Maleic anhydride is especially preferred because of its reactivity and relatively low cost. Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, 1,3,4-cyclopentane tricarboxylic anhydride, etc.

The reaction of the hydroxy-functional compound and the cyclic anhydride can be conducted at temperatures ranging up to about 150° C. but should normally be conducted at temperatures less than about 75° C., preferably less than 65° C., and most preferably between about 35° C. to 60° C. The reaction temperature is maintained until the reaction has proceeded to provide the desired amount of half-ester groups on the acid-functional compound. Normally, as a convenient measure of the extent of the reaction, the reaction will be continued until no change in the amount of residual unreacted anhydride can be observed, and will generally involve reacting at least about 70%, and preferably at least 95%, of the available anhydride. If the subsequent end use of the acid-functional polymer can tolerate the remaining free anhydride, if any, no separation or removal of the excess unreacted anhydride is necessary. If the end use of the acid-functional polymer requires that it be free of any unreacted anhydride, the reaction can be continued until substantially all of the anhydride has reacted, or the free anhydride may be removed by vacuum distillation or other techniques well known in the art.

The level of anhydride reacted with the hydroxy-functional compound need only be sufficient to provide the final desired acid value of the acid-functional compound. Typically the reaction would be conducted by admixing the polyol and the anhydride at levels to provide at least about 0.3 and normally about 0.7 to 1.0 anhydride groups for each hydroxyl group. By conducting the reaction at temperatures less than about 75° C. the carboxylic acid groups formed as part of the half-ester are not appreciably reactive with the hydroxyl groups themselves and so they do not compete with the ring opening half-ester reaction of the remaining anhydrides.

In order to conduct the reaction at these relatively low temperatures, it is preferred to utilize an esterification catalyst. The catalyst should be present in sufficient amount to catalyze the reaction and typically will be present at a level of at least about 0.01%, and normally from about 0.05% to about 3.0%, based upon the weight of the cyclic anhydride. Catalysts which are useful in the esterification reaction of the anhydride with the hydroxy-functional molecule include mineral acids such as hydrochloric acid and sulfuric acid; alkali metal hydroxides such as sodium hydroxide; tin compounds such as stannous octoate, or dibutyltin oxide; aliphatic or aromatic amines, especially tertiary alkyl amines, such as triethylamine; and aromatic heterocyclic amines such as N-methyl imidazole and the like. Especially preferred are N-methyl imidazole and triethylamine.

Although the reaction between the hydroxy-functional compound and the anhydride can be conducted in the absence of solvent if the materials are liquid at the reaction temperature, it is normally preferred to conduct the reaction in the presence of an inert solvent such as esters, ketones, ethers or aromatic hydrocarbons. If desired, the acid-functional molecule can be utilized as the solvent solution, or, optionally, all or part of the inert solvent may be removed, e.g. by distillation, after the reaction is completed.

After the reaction is completed, it is frequently desirable to add a low molecular weight alcohol solvent, such as isobutanol or isopropanol, to the acid-functional at a level of about 5 to 35 percent by weight to provide stabilization on storage.

2.B. Carboxylic Acid-Functional Polymers Prepared From Unsaturated Acid-Functional Monomers.

Useful acid-functional polymers can also be conveniently prepared by the free radical addition polymerization of unsaturated acids such as maleic acid, acrylic acid, methacrylic acid, crotonic acid, etc. along with one or more unsaturated monomers. Representative monomers include the esters of unsaturated acids, vinyl compounds, styrene-based materials, allyl compounds and other copolymerizable monomers as representatively taught in Section 2.A.5. of this specification. The monomers which are co-polymerized with the unsaturated acid should be free of any functionality which could react with the acid groups during the polymerization.

2.C. Carboxylic Acid-Functional Polymers Prepared From Polyols and Polyacids.

Other useful acid-functional polymers include polyester polymers obtained from the reaction of one or more aromatic and/or aliphatic carboxylic acids or their anhydrides and one or more aliphatic and/or aromatic polyols wherein the acid functionality is present in a stoichiometric excess over the hydroxy functionality. Representative carboxylic acids and polyols include those listed in Section 2.A.2. of this specification.

3. EPOXY-FUNCTIONAL COMPOUNDS.

The curable coatings of this invention may also incorporate at least one epoxy-functional compound. The epoxy compounds can, if there are sufficient other reactive materials to provide crosslinking, be monoepoxies or, preferably, a polyepoxide having an average of at least two epoxy groups per molecule.

Representative useful monoepoxides include the monoglycidyl ethers of aliphatic or aromatic alcohols such as butyl glycidyl ether, octyl glycidyl ether, nonyl glycidyl ether, decyl glycidyl ether, dodecyl glycidyl ether, p-tert-butylphenyl glycidyl ether, and o-cresyl glycidyl ether. Monoepoxy esters such as the glycidyl ester of versatic acid (commercially available as CARDURA® E from Shell Chemical Company), or the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used. Additionally, monoepoxidized oils can also be used. Other useful monoepoxies include styrene oxide, cyclohexene oxide, 1,2-butene oxide, 2,3-butene oxide, 1,2-pentene oxide, 1,2-heptene oxide, 1,2-octene oxide, 1,2-nonene oxide, 1,2-decene oxide, and the like.

It is only necessary that the monoepoxide compounds have a sufficiently low volatility to remain in the coating composition under the applicable conditions of cure.

Polyepoxides are especially preferred in the reactive coatings of this invention. Especially preferred as the polyfunctional epoxy compounds, due to their reactivity and durability, are the polyepoxy-functional cycloaliphatic epoxies. Preferably, the cycloaliphatic epoxies will have a number average molecular weight less than about 2,000 to minimize the viscosity. The cycloaliphatic epoxies are conveniently prepared by methods well known in the art such as epoxidation of dienes or polyenes, or the epoxidation of unsaturated esters by reaction with a peracid such as peracetic and/or performic acid.

Commercial examples of representative preferred cycloaliphatic epoxies include 3,4-epoxycyclohexylmethyl 3,4-epoxycyclohexane carboxylate (e.g. "ERL-4221" from Union Carbide Corp.); bis(3,4-epoxycyclohexylmethyl) adipate (e.g. "ERL-4299" from Union Carbide Corporation); 3,4-epoxy-6-methylcyclohexylmethyl3,4-epoxy-6-methylcyclohexane carboxylate (e.g. "ERL-4201" from Union Carbide Corp.); bis(3,4-epoxy-6-methylcyclohexylmethyl)adipate (e.g. "ERL-4289" from Union Carbide Corp.); bis(2,3-epoxycyclopentyl) ether (e.g. "ERL-0400" from Union Carbide Corp.); dipentene dioxide (e.g. "ERL-4269" from Union Carbide Corp.); 2-(3,4-epoxycyclohexyl-5, 5-spiro-3,4-epoxy) cyclohexanemetadioxane (e.g. "ERL-4234" from Union Carbide Corp.). Other commercially available cycloaliphatic epoxies are available from Ciba-Geigy Corporation such as CY 192, a cycloaliphatic diglycidyl ester epoxy resin having an epoxy equivalent weight of about 154. The manufacture of representative cycloaliphatic epoxies is taught in various patents including U.S. Pat. No. 2,884,408, 3,027,357 and 3,247,144.

Other polyepoxides potentially useful in the practices of this invention include aliphatic and aromatic polyepoxies, such as those prepared by the reaction of an aliphatic polyol or poly hydric phenol and an epihalohydrin. Other useful epoxies include epoxidized oils and epoxy-functional copolymers such as acrylic polymers derived from ethylenically unsaturated epoxy-functional monomers such as glycidyl acrylate or glycidyl methacrylate in combination with other copolymerizable monomers such as those listed in 2.A.5 above.

4. HYDROXY-FUNCTIONAL COMPOUNDS

The hydroxy-functional compounds which are useful in combination with the anhydride-functional graft copolymers to prepare curable compositions in the practice of this invention should have an average of at least two hydroxyl groups per molecule. Although low molecular weight diols and polyols such as propylene glycol, 1,6 hexanediol, triethanol amine and pentaerythritol can be utilized in the practice of this invention, it is especially preferred to utilize polymeric hydroxy-functional compounds such as polyethers, polyesters, acrylics, polyurethanes, polycaprolactones, etc.

Preferably the hydroxy-functional polymer will have a number average molecular weight of at least about 400. Typical number average molecular weights will range from about 400 to about 30,000, and especially 1,000 to about 15,000. In order to provide the fastest rate of reaction during cure it is preferred in the practice of this invention to utilize hydroxy-functional compounds having predominantly, and preferably all, primary hydroxy functionality.

Representative hydroxy-functional polymers are taught in Sections 2.A.1. through 2.A.5. Especially preferred as the hydroxy-functional polymer is a hydroxy-functional polymer comprising the addition polymerization reaction product of (a) 10 to about 60 weight percent of a hydroxy-functional ethylenically unsaturated monomer and (b) 40 to about 90 weight percent of at least one ethylenically unsaturated monomer copolymerizable with the hydroxy-functional monomer.

5. AMINE-FUNCTIONAL COMPOUNDS

Amine-functional compounds which are useful in combination with the anhydride-functional graft copolymers to prepare curable compositions in the practice of this invention should have an average of at least two primary or secondary amine groups per molecule. Polyamines can be prepared by methods well known in the art such as by the free radical polymerization of acrylic or other unsaturated monomers having primary or secondary amine functionality, or by the reaction of amines having at least two amine groups per molecule with a polycarboxylic acid to form polyamide amines, or by the reaction of primary amines with epoxy materials to produce secondary amine and hydroxyl functionality. The polyamines can be polymeric, typically having a number average molecular weight over 400, or lower molecular materials, such as piperazine, tetraethylenepentamine, 1,2-diaminopropane, 1,6-diaminohexane, etc. Also useful are the materials having a primary or secondary amine group and a hydroxyl group such as isopropanol amine, isobutanol amine, ethanol amine, etc.

The ratios of anhydride to other functional groups in the curable compositions can be widely varied within the practice of this invention as long as at least some of each group is present in the reactive composition. It is only necessary to combine the anhydride-functional graft copolymer and other reactive materials in amounts to provide the desired degree of crosslinking upon cure. When a combination of the anhydride-functional graft copolymer and a polyol or polyamine is used as the curable composition, it is preferred to provide about 0.3 to about 10 hydroxyl or amine groups for each anhydride group, and especially 1 to about 5 hydroxyl or amine groups for each anhydride group. When the curable composition involves a combination of only the anhydride-functional graft copolymer, an epoxide or polyepoxide, and a polyol it is preferred to provide 0.3 to about 6.0 hydroxyl groups, and about 0.3 to about 6.0 epoxy groups for each anhydride group, and especially to provide 0.5 to 2.5 hydroxyl groups and 0.5 to 2.5 epoxy groups for each anhydride group. When the curable composition involves the anhydride-functional graft copolymer, an acid-functional compound and a polyepoxide, it is preferred to provide 0.3 to 6.0 acid groups and 0.6 to 12.0 epoxy groups for each anhydride group, and especially 2.0 to about 5.0 acid groups and 3.0 to about 8.0 epoxide groups for each anhydride group. If the reactive curable composition comprises the anhydride-functional graft copolymer, an acid-functional compound, an epoxide or polyepoxide, and a hydroxy-functional compound, it is preferred to provide from 0.05 to about 3.0 acid groups and about 0.5 to about 4.0 epoxy groups and about 0.05 to 6.0 hydroxyl groups for each anhydride group in the reactive system. It is especially preferred to provide 1.0 to about 2.0 acid groups and 1.0 to about 3.0 epoxy groups and about 1.0 to about 4.0 hydroxyl groups for each anhydride group.

The curable compositions of this invention can be cured at temperatures ranging from about room temperature up to about 350° F. When the curable compositions are utilized as coatings, the coatings can be clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc.

It is especially preferred in the curable compositions of this invention to include a catalyst for the reaction of anhydride groups and hydroxyl groups and/or a catalyst for the reaction of epoxy and acid groups if present in the curable composition. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride compound and preferably 1.0 to about 5.0%.

Tertiary amines, secondary amines such as ethyl imidazole, quaternary ammonium salts, nucleophilic catalysts, such as lithium iodide, phosphonium salts, and phosphines such as triphenyl phosphine are especially useful as catalysts for epoxy/acid reactions. The catalyst for the epoxy/acid reaction will typically be present at a level of at least 0.01% by weight of the total acid-functional compound and epoxy-functional compound and will preferably be present at 0.1 to about 3.0%.

Since the curable compositions of this invention are typically provided as multi-package systems which must be mixed together prior to use, the pigments, catalysts and other additives can be conveniently added to any or all of the appropriate individual packages.

The curable compositions of this invention may typically be applied to any substrate such as metal, plastic, wood, glass, synthetic fibers, etc. by brushing, dipping, roll coating, flow coating, spraying, in-mold coating or other method conventionally employed in the coating industry.

One preferred application of the curable coatings of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate followed by the application of a clearcoat which will not mix with or have any appreciable solvent attack upon the previously applied basecoat. Typically, at least some of the solvent will be allowed to evaporate from the basecoat prior to the application of the clearcoat. In some applications the basecoat may even be allowed to cure, at least partially, prior to application of the clearcoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters for either type of polymer include methyl methacrylate, ethyl methacrylate, propyl methacrylate, butyl methacrylate, ethyl acrylate, butyl acrylate, vinyl acetate, acrylonitrile, acrylamide, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a carbodiimide, a polyanhydride, a polyisocyanate a polyepoxide, or a nitrogen resin such as a condensate of an aldehyde such as formaldehyde with a nitrogenous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and poly carboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain waxes, rheology modifiers, cellulose esters, or other additives to alter the appearance, drying or viscosity characteristics of the basecoat.

Typically, the basecoat will include pigments conventionally used for coating compositions and after being applied to a substrate, which may or may not previously have been primed, the basecoat will normally be allowed sufficient time to form a wet polymer film which will not be lifted during the application of the clearcoat. The clearcoat is then applied to the surface of the basecoat, and the system can be allowed to dry or, if desired, can be force dried by baking the coated substrate at temperatures typically ranging up to about 250° F. Typically, the clearcoat may contain ultraviolet light absorbers or stabilizers, such as hindered phenols or hindered amines at a level ranging up to about 6 % by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6.0, and especially about 0.5 to about 3.0 mils.

The following examples have been selected to illustrate specific embodiments and practices of advantage to a more complete understanding of the invention. Unless otherwise stated, "parts" means parts-by-weight and "percent" is percent-by-weight and equivalent weight is on a weight solids basis.

EXAMPLE A

Preparation of Unsaturated Polymer

A reaction vessel equipped with a mechanical stirrer, condenser and temperature controlling device was charged with 390.0 parts VESTENAMER® L-3000 (a soft, waxy polyolefin available from Huls Aktiengesellschaft, and which is derived from cyclooctene and has a number average molecular weight of approximately 1,600, an iodine number of approximately 250 and has a composition comprising approximately 78% trans double bonds, 17% cis double bonds and 5% 1,2-vinyl double bonds), 210.0 parts maleic anhydride and 18 parts xylene. The reaction mixture was gradually heated from room temperature up to about 200° C. under a nitrogen blanket over a period of about 3½ hours. The reaction mixture was maintained at approximately 200° C. for an additional 5 hours and 40 minutes to yield a polymeric product at approximately 96.0% NVM having an acid value of 185.8 based upon weight solids.

EXAMPLE B

Preparation of Unsaturated Polymer

A reaction vessel equipped as in Example A was charged with 1456 parts VESTENAMER® L-3000, 624.0 parts maleic anhydride and 41.6 parts xylene. The reaction mixture was heated to 200° C. over approximately 1 hour 45 minutes and held at 200° C. for approximately 45 minutes at which point an additional 41.6 parts xylene were added for reflux. After approximately an additional 20 minutes, 50.0 parts n-butyl acetate was added to maintain the reflux at 200° C. The reaction mixture was then maintained at 200° C. for an additional 4 hours at which point it was allowed to cool and was reduced with 416.8 parts n-butyl acetate to produce an unsaturated polymer having an NVM of approximately 80.5 and an acid value measured as 169.7 and a density of 8.37 pounds per gallon.

EXAMPLE 1

Preparation of Graft Copolymer

A reaction vessel equipped as described in Example A was charged with 823.0 parts of the 96% NVM polymer prepared in Example A and 199.5 parts methyl ethyl ketone. The mixture was heated to approximately 100° C. and the dropwise addition of a monomer mixture comprising 46.5 parts acrylic acid, 92.9 parts methyl methacrylate and 4.2 pans t-butyl peroctoate was added in a dropwise addition over approximately a 2½ hour period. After the completion of the monomer addition, the reaction mixture was maintained at 100° C. for approximately 3 hours at which point 144.3 pans propylene glycol monomethyl ether acetate was added and the reaction mixture was allowed to cool. The anhydride-functional graft copolymerization product had a measured acid value of 190.4 and was approximately 81.3% NVM.

EXAMPLE 2

Preparation of Anhydride-Functional Graft Copolymer

A reaction vessel equipped as described in Example A was charged with 417.0 parts of the 96% NVM unsaturated polymer of Example A, 71.6 parts methyl ethyl ketone and 36.8 parts propylene glycol monomethyl ether acetate and heated to 100° C. under a nitrogen blanket. A monomer mixture of 25.0 parts methacrylic acid, 75.1 parts methyl methacrylate and 3.0 parts t-butyl peroctoate were added in a dropwise fashion over approximately 2½ hours. The reaction mixture was maintained at 100° C. for 3 hours at which point the reaction mixture was allowed to cool and was reduced with 144.3 parts propylene glycol monomethyl ether acetate.

EXAMPLE 3

Preparation of Anhydride-Functional Graft Copolymer

A reaction vessel equipped as described in Example A was charged with 402.0 parts of the 96 % NVM unsaturated polymer of Example A and 97.4 parts propylene glycol monomethyl ether acetate. The reaction was heated to 100° C., and a monomer mixture of 22.7 parts methacrylic acid, 45.4 parts methyl methacrylate and 2.0 parts t-butyl peroctoate was added in dropwise fashion over a period of approximately 2 hours. The reaction mixture was maintained at 100° C. for approximately 15 minutes after the addition of all of the monomer and was then reduced with 340.5 parts propylene glycol monomethyl ether acetate, and the mixture was maintained at 100° C. for an additional 1 hour. The anhydride-functional graft copolymer product was 49.3 % NVM, had a density of approximately 8.54 pounds per gallon and an acid value based upon weight solids of 200.7.

EXAMPLE 4

Preparation of Anhydride-Functional Graft Copolymer

A reaction vessel equipped as described in Example A was charged with 567.0 parts xylene and heated to approximately 90° C. A mixture of 189.0 parts xylene, 100.8 parts maleic anhydride, 201.6 parts methyl methacrylate, 201.6 parts isobornyl methacrylate, 420.0 parts of the unsaturated polymer of Example B and 42.0 parts t-butyl peroctoate were added in a dropwise manner to the heated xylene solution over a period of approximately 3 hours. The reaction mixture was then maintained at 90° C. for an additional hour to yield the graft copolymer product having an NVM of approximately 50.2 %, a measured acid value of approximately 132.8 and a density of 8.19 pounds per gallon. The z average molecular weight was 190,000, the weight average molecular weight was 29,000 and the number average molecular weight was 3,400, as measured by gel permeation chromatography.

EXAMPLE 5

Preparation of Anhydride-Functional Graft Copolymer

A reaction vessel equipped as described in Example A was charged with 567.0 parts xylene and heated under a nitrogen blanket to 90° C. A mixture of 189.0 parts xylene, 100.8 parts maleic anhydride, 252.0 parts isobornyl methacrylate, 151.2 parts methyl methacrylate, 420.0 parts of the unsaturated polymer of Example B and 42.0 parts t-butyl peroctoate were added in a dropwise manner to the heated xylene solution over a period of approximately 3 hours. The reaction was maintained at 90° C. for an additional 15 minutes after the completion of the addition of the reactant materials, and the mixture was then allowed to cool to produce the anhydride-functional graft copolymer having an NVM of approximately 50.0 %, a measured acid value of 131.8 and a density of 8.17 pounds per gallon. Gel permeation chromatography measurements indicated a z average molecular weight of 220,000, a weight average molecular weight of 35,000 and a number average molecular weight of 3,600.

Example 6

A representative useful primer surfacer could be prepared by admixing any of the anhydride-functional graft copolymers of Examples 1 through 5 with ULTRA FILL II® P6H49 (commercially available hydroxy-functional primer/surfacer from The Sherwin-Williams Company, having a hydroxyl equivalent weight of 2,333 as packaged at 10.54 lbs/gal to provide an OH/anhydride equivalent ratio of approximately 1.5/1 and catalyzing the mixture by the addition of 2½% N-methyl imidazole based on the weight solids of the anhydride-functional polymer. The primer/surfacer could be reduced with suitable solvents, spray applied to suitable substrates and allowed to cure.

EXAMPLE 7

A representative useful clear coating could be prepared according to the following recipe:

| Raw Material | Parts |
| --- | --- |
| Hydroxy-Functional Polymer[1] | 205 |
| Solvent Blend[2] | 145 |
| Byk 300[3] | 3 |
| tinuvin 292[4] | 8 |
| ERL 4299[5] | 125 |
| Anhydride Polymer of Example 4 | 518 |
| 20% N-Methyl Imidazole/Methyl Isobutyl Ketone | 20 |

| Raw Material | Parts |
| --- | --- |

¹61.2% NVM hydroxy-functional polymer in methyl amyl ketone comprising the free radical addition product of styrene/methyl/methacrylate/hydroxy ethyl acrylate in a weight ratio of 15/56/29.
²Butyl acetate/methyl amyl ketone/methoxyethyl propionate/methyl isobutyl ketone/xylene/methyl ethyl ketone in a weight ration of 57/18/10/5/5/5.
³Flow control agent sold by Byk-Malinkrodt.
⁴Trademark of Ciba-Geigy for di[4(2,2,6,6-tetramethyl piperdinyl)]sebacate.
⁵Union Carbide tradename for bis(3,4-epoxycyclohexylmethyl) adipate.

The clear coating could be applied to steel panels which were prepared by application of a primer/sealer (such as E2G973 vinyl wash primer/sealer commercially available from The Sherwin-Williams Company) and by application of a basecoat (such as blue metallic ULTRABASE® 7 F5L63/F5S112 in a 60/40 weight ratio, commercially available from The Sherwin-Williams Company). While this invention has been described by a specific number of embodiments, other variations and modifications may be made without departing from the spirit and scope of the invention as set forth in the appended claims.

The entire disclosure of all applications, patents and publications cited herein are hereby incorporated by reference.

The invention claimed is:

1. A curable composition which comprises (a) an anhydride-functional polymer and (b) a compound having an average of at least two functional groups per molecule which are reactive with anhydride groups; wherein the anhydride-functional polymer is obtained by reacting under graft copolymerization conditions, (A) an unsaturated polymer which was obtained by reacting under ene reaction conditions a mixture of reactants comprising:

(i) 20 to 70 percent by weight of an unsaturated anhydride having the structure:

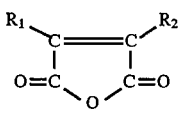

wherein $R_1$ and $R_2$ are each independently hydrogen, alkyl of 1 to about 6 carbons, or alkoxy of 1 to about 6 carbons, or a halogen; and (ii) 30 to 80 percent by weight of at least one polyolefin having at least two carbon-carbon double bonds in the polyolefin backbone and having an average of at least three carbon atoms in the polyolefin backbone between the carbon-carbon double bonds; and (B) at least one ethylenically unsaturated monomer which is copolymerizable with the unsaturated polymer.

2. The curable composition of claim 1 wherein the backbone of the polyolefin is comprised primarily of repeating units having the structure:

wherein each x is individually a number from 2 to about 15; and $R_3$, $R_4$ and $R_5$ are each individually hydrogen, or a linear, branched or cyclic aliphatic group of 1 to about 18 carbon atoms.

3. The curable composition of claim 1 wherein the polyolefin comprises the structure:

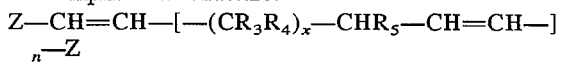

wherein each x is individually a number from 2 to about 15; $R_3$, $R_4$ and $R_5$ are each individually hydrogen, or a linear, branched or cyclic aliphatic group of 1 to about 18 carbon atoms; each Z is individually hydrogen or a linear, branched or cyclic aliphatic group of 1 to about 36 carbons; and n is a number between 2 and 5,000.

4. The curable composition of claim 3 wherein n is between 2 and 100.

5. The curable composition of claim 3 wherein n is between 8 and 28.

6. The curable composition of claim 1 wherein the polyolefin is obtained by the metathesis of a cyclic olefin.

7. The curable composition of claim 6 wherein the cyclic olefin is cyclooctene.

8. The curable composition of claim 2 wherein x is between 4 and 12.

9. The curable composition of claim 2 wherein $R_3$, $R_4$ and $R_5$ are each hydrogen.

10. The curable composition of claim 1 wherein the compound having an average of at least two functional groups per molecule reactive with anhydride groups is a polyamine.

11. The curable composition of claim 1 wherein the compound having an average of at least two functional groups per molecule reactive with anhydride groups is a hydroxy-functional compound.

12. The curable composition of claim 11 wherein the anhydride-functional graft copolymer and the hydroxy-functional compound are each present at a level to provide 0.3 to about 10 hydroxyl groups for each anhydride group.

13. The curable composition of claim 11 wherein the hydroxy-functional compound is a hydroxy-functional polymer.

14. The curable composition of claim 13 wherein the hydroxy-functional polymer comprises the addition polymerization reaction product of:

(a) 10 to about 60 weight percent of a hydroxy-functional ethylenically unsaturated monomer; and (b) 40 to about 90 weight percent of at least one ethylenically unsaturated monomer copolymerizable with the hydroxy-functional monomer.

15. The curable composition of claim 11 wherein the composition also comprises a catalyst for the reaction of hydroxy groups and anhydride groups.

16. The curable composition of claim 11 wherein the composition also comprises an epoxy-functional compound having an average of at least one epoxy group per molecule.

17. The curable composition of claim 16 wherein the anhydride-functional graft copolymer, the hydroxy-functional compound, and the epoxy-functional compound are each present at a level to provide 0.3 to about 6.0 hydroxyl groups, and about 0.3 to about 6.0 epoxy groups for each anhydride group.

18. The curable composition of claim 16 wherein the epoxy-functional compound is a monoepoxide.

19. The curable composition of claim 16 wherein the epoxy-functional compound is a polyepoxide having an average of at least two epoxy groups per molecule.

20. The curable composition of claim 19 wherein the polyepoxide is a cycloaliphatic polyepoxide.

21. The curable composition of claim 19 wherein the polyepoxide is a copolymer obtained by the copolymerization of an ethylenically unsaturated epoxy-functional monomer and at least one other copolymerizable ethylenically unsaturated monomer.

22. The curable composition of claim 16 wherein the composition also comprises an acid-functional compound having an average of at least two carboxylic acid groups per molecule.

23. The curable composition of claim 22 wherein the composition also comprises a catalyst for the reaction of hydroxy groups and anhydride groups and a catalyst for the reaction of epoxy groups and acid groups.

24. The curable composition of claim 22 wherein the acid-functional compound is an acid-functional polymer.

25. The curable composition of claim 24 wherein the acid-functional polymer is prepared by the half-ester opening of a cyclic anhydride by reaction with a hydroxy-functional polymer.

26. The curable composition of claim 23 wherein the hydroxy-functional polymer is the addition polymerization reaction product of:
   (a) 5 to 100 weight percent of a hydroxy-functional ethylenically unsaturated monomer; and
   (b) 0 to 95 weight percent of at least one other ethylenically unsaturated monomer copolymerizable with the hydroxy-functional monomer.

27. The curable composition of claim 22 wherein the anhydride-functional graft copolymer, the hydroxy-functional compound, the acid-functional compound and the epoxy-functional compound are each present at a level to provide 0.05 to about 3.0 acid groups and about 0.5 to about 4.0 epoxy groups an about 0.05 to about 6.0 hydroxyl groups for each anhydride group.

28. A curable composition which comprises:
   (a) an anhydride-functional polymer; and
   (b) an acid-functional compound having an average of at least two carboxylic acid groups per molecule; and
   (c) an epoxy-functional compound;
   wherein the anhydride-functional polymer is obtained by reacting under graft copolymerization conditions,
   (A) an unsaturated polymer which was obtained by reacting under ene reaction conditions a mixture of reactants comprising:
      (i) 20 to 70 percent by weight of an unsaturated anhydride having the structure:

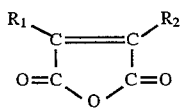

wherein $R_1$ and $R_2$ are each independently hydrogen, alkyl of 1 to about 6 carbons, or alkoxy of 1 to about 6 carbons, or a halogen; and
      (ii) 30 to 80 percent by weight of at least one polyolefin having at least two carbon-carbon double bonds in the polyolefin backbone and having an average of at least three carbon atoms in the polyolefin backbone between the carbon-carbon double bonds; and
   (B) at least one ethylenically unsaturated monomer which is copolymerizable with the unsaturated polymer.

29. The curable composition of claim 28 wherein the backbone of the polyolefin is comprised primarily of repeating units having the structure:

wherein each x individually a number from 2 to about 15; and $R_3$, $R_4$ and $R_5$ are each individually hydrogen, or a linear, branched or cyclic aliphatic group of 1 to about 18 carbon atoms.

30. The curable composition of claim 28 wherein the polyolefin comprises the structure:

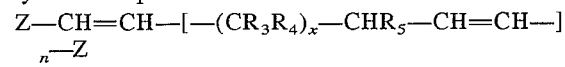

wherein each x is individually a number from 2 to about 15; $R_3$, $R_4$ and $R_5$ are each individually hydrogen, or a linear, branched or cyclic aliphatic group of 1 to about 18 carbon atoms; each Z is individually hydrogen or a linear, branched or cyclic aliphatic group of 1 to about 36 carbons; and n is a number between 2 and 5,000.

31. The curable composition of claim 30 wherein n is between 2 and 100.

32. The curable composition of claim 30 wherein n is between 8 and 28.

33. The curable composition of claim 28 wherein the polyolefin is obtained by the metathesis of a cyclic olefin.

34. The curable composition of claim 33 wherein the polyolefin is derived from cyclooctene.

35. The curable composition of claim 29 wherein x is between 4 and 12.

36. The curable composition of claim 29 wherein $R_3$, $R_4$ and $R_5$ are each hydrogen.

37. The curable composition of claim 28 wherein the acid-functional compound is an acid-functional polymer.

38. The curable composition of claim 37 wherein the acid-functional polymer is prepared by the half-ester opening of a cyclic anhydride by reaction with a hydroxy-functional polymer.

39. The curable composition of claim 38 wherein the hydroxy-functional polymer is the addition polymerization reaction product of:
   (a) 5 to 100 weight percent of a hydroxy-functional ethylenically unsaturated monomer; and
   (b) 0 to 95 weight percent of at least one other ethylenically unsaturated monomer copolymerizable with the hydroxy-functional monomer.

40. The curable composition of claim 28 wherein the epoxy-functional compound is a monoepoxide.

41. The curable composition of claim 28 wherein the epoxy-functional compound is a polyepoxide having an average of at least two epoxy groups per molecule.

42. The curable composition of claim 41 wherein the polyepoxide is a cycloaliphatic polyepoxide.

43. The curable composition of claim 41 wherein the polyepoxide is a copolymer obtained by the copolymerization of an ethylenically unsaturated epoxy-functional monomer and at least one other copolymerizable ethylenically unsaturated monomer.

44. The curable composition of claim 28 wherein the anhydride-functional graft copolymer and the acid-functional compound and the epoxy-functional compound are each present at a level to provide 0.3 to about 6.0 acid groups and 0.6 to 12.0 epoxy groups for each anhydride group.

45. The curable composition of claim 28 wherein the composition also comprises a catalyst for the reaction of acid groups and epoxy groups and a catalyst for the reaction of anhydride groups and hydroxyl groups.

46. In a substrate coated with a multi-layer decorative and/or protective coating which comprises:
   (a) a basecoat comprising a pigmented film-forming polymer; and
   (b) a transparent clearcoat comprising a film-forming polymer applied to the surface of the basecoat composition;
the improvement which comprises utilizing as the clearcoat and/or the basecoat a multi-component curable composition which is reactive upon mixing of the components, wherein the multi-component curable composition comprises (a) an anhydride functional polymer and (b) a compound having an average of at least two functional groups per molecule which are reactive with anhydride groups; wherein the anhydride-functional polymer is obtained by reacting under graft copolymer conditions,
(A) an unsaturated polymer which was obtained by reacting under ene reaction conditions a mixture of reactants comprising:
(i) 20 to 70 percent by weight of an unsaturated anhydride having the structure:

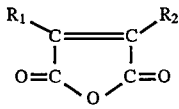

wherein $R_1$ and $R_2$ are each independently hydrogen, alkyl of 1 to about 6 carbons, or alkoxy of 1 to about 6 carbons, or a halogen; and
(ii) 30 to 80 percent by weight of at least one polyolefin having at least two carbon-carbon double bonds in the polyolefin backbone and having an average of at least three carbon atoms in the polyolefin backbone between the carbon-carbon double bonds; and
(B) at least one ethylenically unsaturated monomer which is copolymerizable with the unsaturated polymer.

47. The curable composition of claim 46 wherein the backbone of the polyolefin is comprised primarily of repeating units having the structure:

wherein each x is individually a number from 2 to about 15; and $R_3$, $R_4$ and $R_5$ are each individually hydrogen, or a linear, branched or cyclic aliphatic group of 1 to about 18 carbon atoms.

48. The curable composition of claim 46 wherein the polyolefin comprises the structure:

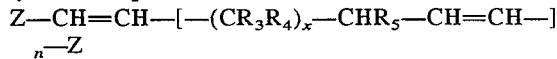

wherein each x is individually a number from 2 to about 15; $R_3$, $R_4$ and $R_5$ are each individually hydrogen, or a linear, branched or cyclic aliphatic group of 1 to about 18 carbon atoms; each Z is individually hydrogen or a linear, branched or cyclic aliphatic group of 1 to about 36 carbons; and n is a number between 2 and 5,000.

49. The coated substrate of claim 48 wherein n is between 2 and 100.

50. The coated substrate of claim 48 wherein n is between 8 and 28.

51. The coated substrate of claim 46 wherein the polyolefin is obtained by the metathesis of a cyclic olefin.

52. The coated substrate of claim 51 wherein the cyclic olefin is cyclooctene.

53. The coated substrate of claim 46 wherein x is between 4 and 12.

54. The coated substrate of claim 46 wherein $R_3$, $R_4$ and $R_5$ are each hydrogen.

55. The coated substrate of claim 46 wherein the compound having an average of at least two functional groups per molecule reactive with anhydride groups is a polyamine.

56. The coated substrate of claim 46 wherein the compound having an average of at least two functional groups per molecule reactive with anhydride groups is a hydroxy-functional compound.

57. The coated substrate of claim 56 wherein the anhydride-functional graft copolymer and the hydroxy-functional compound are each present at a level to provide 0.3 to about 10 hydroxyl groups for each anhydride group.

58. The coated substrate of claim 56 wherein the hydroxy-functional compound is a hydroxy-functional polymer.

59. The coated substrate of claim 58 wherein the hydroxy-functional polymer comprises the addition polymerization reaction product of:
(a) 10 to about 60 weight percent of a hydroxy-functional ethylenically unsaturated monomer; and
(b) 40 to about 90 weight percent of at least one ethylenically unsaturated monomer copolymerizable with the hydroxy-functional monomer.

60. The coated substrate of claim 56 wherein the curable composition also comprises a catalyst for reaction of hydroxy groups and anhydride groups.

61. The coated substrate of claim 56 wherein the curable composition also comprises an epoxy-functional compound having an average of at least one epoxy group per molecule.

62. The coated substrate of claim 61 wherein the anhydride-functional graft copolymer, the hydroxy-functional compound, and the epoxy-functional compound are each present in the curable composition at a level to provide 0.3 to about 6.0 hydroxyl groups, and about 0.3 to about 6.0 epoxy groups for each anhydride group.

63. The coated substrate of claim 61 wherein the epoxy-functional compound is a monoepoxide.

64. The coated substrate of claim 61 wherein the epoxy-functional compound is a polyepoxide having an average of at least two epoxy groups per molecule.

65. The coated substrate of claim 64 wherein the polyepoxide is a cycloaliphatic polyepoxide.

66. The coated substrate of claim 64 wherein the polyepoxide is a copolymer obtained by the copolymerization of an ethylenically unsaturated epoxy-functional monomer and at least one other copolymerizable ethylenically unsaturated monomer.

67. The coated substrate of claim 61 wherein the curable composition also comprises an acid-functional compound having an average of at least two carboxylic acid groups per molecule.

68. The coated substrate of claim 67 wherein the curable composition also comprises a catalyst for the reaction of hydroxy groups and anhydride groups and a catalyst for the reaction of epoxy groups and acid groups.

69. The coated substrate of claim 67 wherein the acid-functional compound is an acid-functional polymer.

70. The coated substrate of claim 69 wherein the acid-functional polymer is prepared by the half-ester opening of a cyclic anhydride by reaction with a hydroxy-functional polymer.

71. The coated substrate of claim 70 wherein the hydroxy-functional polymer is the addition polymerization reaction product of:
(a) 5 to 100 weight percent of a hydroxy-functional ethylenically unsaturated monomer; and
(b) 0 to 95 weight percent of at least one other ethylenically unsaturated monomer copolymerizable with the hydroxy-functional monomer.

72. The coated substrate of claim 67 wherein the anhydride-functional graft copolymer, the hydroxy-functional compound, the acid-functional compound and the epoxy-functional compound are each present in the curable composition at a level to provide 0.05 to about 3.0 acid groups and about 0.5 to about 4.0 epoxy groups an about 0.05 to about 6.0 hydroxyl groups for each anhydride group.

73. In a substrate coated with a multi-layer decorative and/or protective coating which comprises:
(a) a basecoat comprising a pigmented film-forming polymer; and
(b) a transparent clearcoat comprising a film-forming polymer applied to the surface of the basecoat composition;

the improvement which comprises utilizing as the clearcoat and/or the basecoat a multi-component curable composition which is reactive upon mixing of the components, wherein the multi-component curable composition comprises:
  (a) an anhydride-functional polymer; and
  (b) an acid-functional compound having an average of at least two carboxylic acid groups per molecule; and
  (c) an epoxy-functional compound;
wherein the anhydride-functional polymer is obtained by reacting under graft copolymerization conditions,
  (A) an unsaturated polymer which was obtained by reacting under ene reaction conditions a mixture of reactants comprising:
    (i) 20 to 70 percent by weight of an unsaturated anhydride having the structure:

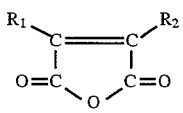

wherein $R_1$ and $R_2$ are each independently hydrogen, alkyl of 1 to about 6 carbons, or alkoxy of 1 to about 6 carbons, or a halogen; and
    (ii) 30 to 80 percent by weight of at least one polyolefin having at least two carbon-carbon double bonds in the polyolefin backbone and having an average of at least three carbon atoms in the polyolefin backbone between the carbon-carbon double bonds; and
  (B) at least one ethylenically unsaturated monomer which is copolymerizable with the unsaturated polymer.

74. The curable composition of claim 73 wherein the backbone of the polyolefin is comprised primarily of repeating units having the structure:

wherein each x individually a number from 2 to about 15; and $R_3$, $R_4$ and $R_5$ are each individually hydrogen, or a linear, branched or cyclic aliphatic group of 1 to about 18 carbon atoms.

75. The curable composition of claim 73 wherein the polyolefin comprises the structure:

$$Z—CH=CH—[—(CR_3R_4)_x—CHR_5—CH=CH—]_n—Z$$

wherein each x is individually a number from 2 to about 15; $R_3$, $R_4$ and $R_5$ are each individually hydrogen, or a linear, branched or cyclic aliphatic group of 1 to about 18 carbon atoms; each Z is individually hydrogen or a linear, branched or cyclic aliphatic group of 1 to about 36 carbons; and n is a number between 2 and 5,000.

76. The coated substrate of claim 75 wherein n is between 2 and 100.

77. The coated substrate of claim 75 wherein n is between 8 and 28.

78. The coated substrate of claim 73 wherein the polyolefin is obtained by the metathesis of a cyclic olefin.

79. The coated substrate of claim 78 wherein the cyclic olefin is cyclooctene.

80. The coated substrate of claim 74 wherein x is between 5 and 12.

81. The coated substrate of claim 74 wherein $R_3$, $R_4$ and $R_5$ are each hydrogen.

82. The coated substrate of claim 73 wherein the acid-functional compound is an acid-functional polymer.

83. The coated substrate of claim 82 wherein the acid-functional polymer is prepared by the half-ester opening of a cyclic anhydride by reaction with a hydroxy-functional polymer.

84. The coated substrate of claim 83 wherein the hydroxy-functional polymer is the addition polymerization reaction product of
  (a) 5 to 100 weight percent of a hydroxy-functional ethylenically unsaturated monomer; and
  (b) 0 to 95 weight percent of at least one other ethylenically unsaturated monomer copolymerizable with the hydroxy-functional monomer.

85. The coated substrate of claim 73 wherein the epoxy-functional compound is a monoepoxide.

86. The coated substrate of claim 73 wherein the epoxy-functional compound polyepoxide having an average of at least two epoxy groups per molecule.

87. The coated substrate of claim 86 wherein the polyepoxide is a cycloaliphatic polyepoxide.

88. The coated substrate of claim 86 wherein the polyepoxide is a copolymer obtained by the copolymerization of an ethylenically unsaturated epoxy-functional monomer and at least one other copolymerizable ethylenically unsaturated monomer.

89. The coated substrate of claim 73 wherein the anhydride-functional graft copolymer and the acid-functional compound and the epoxy-functional compound are each present in the curable composition at a level to provide 0.3 to about 6.0 acid groups and 0.6 to 12.0 epoxy groups for each anhydride group.

90. The coated substrate of claim 73 wherein the composition also comprises a catalyst for the reaction of acid groups and epoxy groups and a catalyst for the reaction of anhydride groups and hydroxyl groups.

91. A method of using a anhydride-functional graft copolymer as a crosslinker, which method comprises admixing the anhydride-functional graft copolymer with a compound having an average of at least two functional groups per molecule which are reactive with anhydride groups and allowing the anhydride-functional graft copolymer and the compound to react; wherein the anhydride-functional graft copolymer has an average of at least two anhydride groups per molecule and comprises the polymer obtained by reacting under graft copolymerization reaction conditions,
  (A) an unsaturated polymer which was obtained by reacting under ene reaction conditions a mixture of reactants comprising:
    (i) 20 to 70 percent by weight of an unsaturated anhydride having the structure:

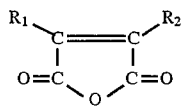

wherein $R_1$ and $R_2$ are each independently hydrogen, alkyl of 1 to about 6 carbons, or alkoxy of 1 to about 6 carbons, or a halogen; and
    (ii) 30 to 80 percent by weight of at least one polyolefin having at least two carbon-carbon double bonds in the polyolefin backbone and having an average of at least three carbon atoms in the polyolefin backbone between the carbon-carbon double bonds; and
  (B) at least one ethylenically unsaturated monomer which is copolymerizable with the unsaturated polymer.

92. A process for preparing an anhydride-functional polymer which process comprises:
  (a) obtaining an unsaturated anhydride-functional polymer by admixing under ene reaction conditions:
    (i) 20 to 70 percent by weight of an unsaturated anhydride having the structure:

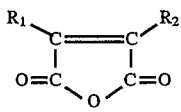

wherein $R_1$ and $R_2$ are each independently hydrogen, alkyl of 1 to about 6 carbons, or alkoxy of 1 to about 6 carbons, or a halogen; and (ii) 30 to 80 percent by weight of at least one polyolefin having at least two carbon-carbon double bonds in the polyolefin backbone and having an average of at least three carbon atoms in the polyolefin backbone between the carbon-carbon double bonds; and (b) graft copolymerizing the unsaturated polymer with at least one ethylenically unsaturated monomer.

* * * * *